Figure 1:
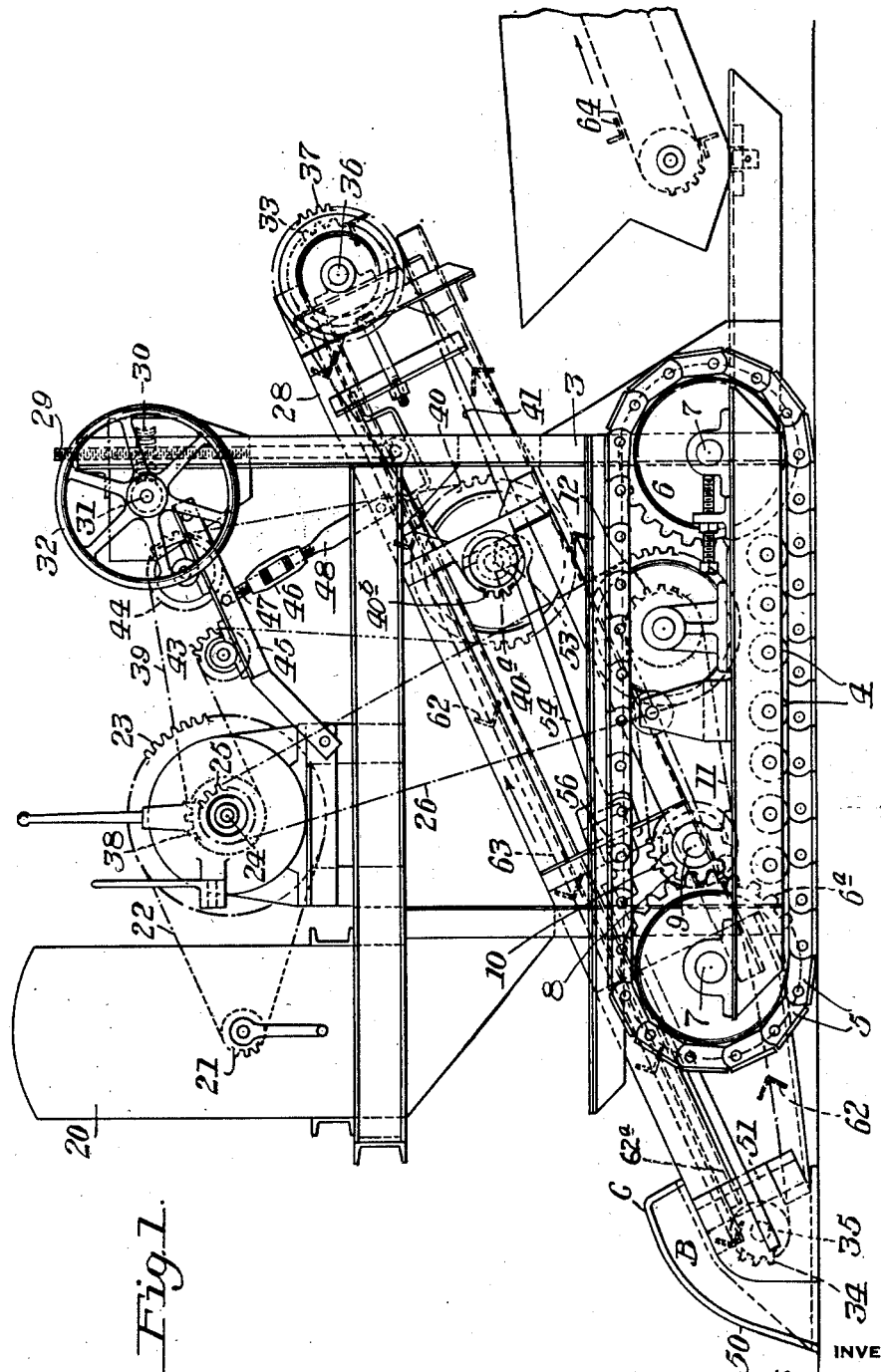

Nov. 12, 1929.   H. B. WALKER   1,735,365
MATERIAL HANDLING APPARATUS
Filed Jan. 20, 1927   2 Sheets-Sheet 1

INVENTOR
Henry B. Walker
By Arthworth Martin,
Attorney.

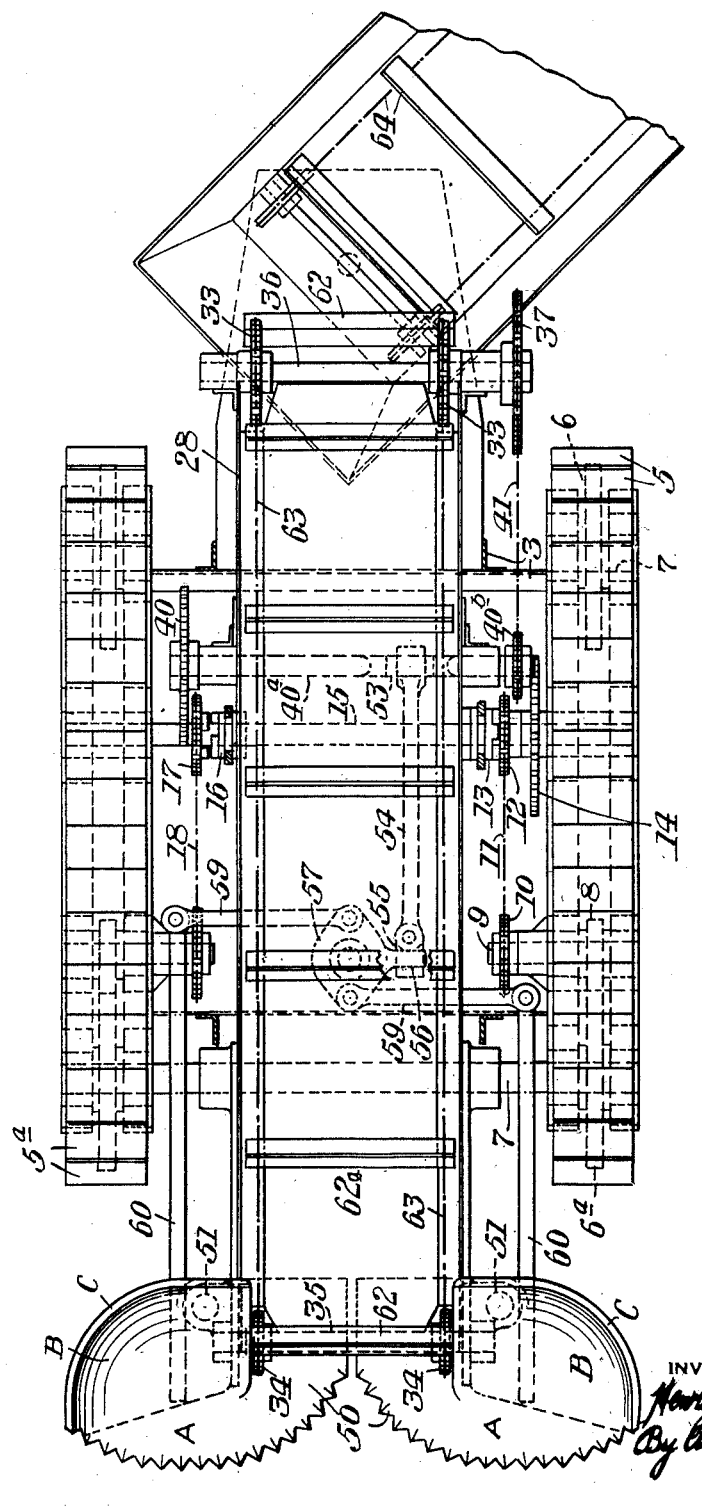

Patented Nov. 12, 1929

1,735,365

UNITED STATES PATENT OFFICE

HENRY B. WALKER, OF MARION, OHIO, ASSIGNOR TO THE FAIRFIELD ENGINEERING COMPANY, OF MARION, OHIO, A CORPORATION OF OHIO

MATERIAL-HANDLING APPARATUS

Application filed January 20, 1927. Serial No. 162,268.

My invention relates to material-handling apparatus and particularly to that class of mechanism which is especially adapted for handling coal, earth, and the like.

In removing coal from storage piles, excavating earth, etc., by means of conveyers or elevators, apparatus, in addition to a conveyer, is frequently required in order to place the material upon the conveyer, particularly if the pile of material is somewhat hardened or closely compacted.

One object of my invention is to provide a material loosening and transferring mechanism arranged in cooperative relation to a conveyer.

Another object of my invention is to provide an improved form of plow mechanism for loosening and directing a flow of loosened material in a predetermined path.

Another object of my invention is to simplify and improve generally the structure and operation of material-handling systems.

One form which my invention may take is shown in the accompanying drawing, wherein Figure 1 is a side elevational view of apparatus embodying my invention, and Fig. 2 is a sectional plan view of the apparatus of Fig. 1.

The apparatus is shown as mounted upon a caterpillar structure of somewhat the usual type. The tractor comprises the usual framework 3 in which are journaled rollers 4 that serve as anti-friction thrust bearings for tread links 5 when they are in the lower flights of the chains which contain such links. The chain links are driven by the usual sprocket wheels 6 and 6ª. The sprocket wheels 6 and 6ª are secured to shafts 7 that are journaled in the ends of the framework 3. The sprocket wheel 6ª is driven by a pinion 8 that is mounted upon a shaft 9, to which is secured a sprocket wheel 10. A claim indicated diagrammatically by the pitch line 11, transmits power to the sprocket wheel 10, from a sprocket wheel 12 that has driving connection through a clutch 13 of any usual form with a sprocket wheel 14. The sprocket 14 is connected to a shaft 15 that has connection through a clutch 16 with a sprocket wheel 17, which, through a chain indicated diagrammatically by the line 18, drives the tread links 5ª at the opposite side of the tractor, through connections similar to the driving connections to the tread links 5. The sprocket wheel 14 is driven from a motor 20, through a pinion 21, a drive chain 22, sprocket wheel 23, a shaft 24, a pinion 25 and a chain 26, the pinion 25 having clutch connection with the shaft 24.

The parts above specifically described are of a somewhat standard form of apparatus, and therefore need not be further explained in detail.

Referring now more particularly to that portion of the apparatus to which my invention especially relates, I provide a conveyer frame 28 that is pivotally mounted at its lower end upon the shaft 7 and its upper end is supported by a pair of adjusting screws 29 (only one of which is visible on the drawing) with which worm gears 30, that are suitably journaled in the upper framework, have screw-threaded engagement. The worm gears 30 mesh with a worm shaft 31 to which a hand wheel 32 is connected. Rotative movement of the handwheel 32 will therefore cause the upper end of the conveyer to be raised or lowered as desired, to vary the inclination of such conveyer as well as the inclination of the plows to be hereinafter described.

At the upper and lower ends of the frame 28, I mount conveyer chain sprockets 33 and 34. The sprockets 34 are secured to a shaft 35 that is journaled in the framework 28 and the sprockets 33 are secured to a shaft 36 that is mounted in the frame 28. The shaft 36 is driven by means of a sprocket wheel 37, from the motor 20 and the sprocket wheel 23, through a sprocket wheel 38 that has clutch connection with the shaft 24, through a driving chain indicated by the dot dash line 39; a sprocket wheel 40; a shaft 40ª; a sprocket 40ᵇ, and a drive chain 41. The sprocket chain 39 passes around idler sprockets 43 and 44 that are mounted upon a pivoted bracket 45 which is adjustable by means of a turn buckle 46 that has screw-threaded engagement with rods 47 and 48 which have pivotal connection with the bracket 45 and the frame 28, respectively, so that the tension of the chain 39 can be adjusted, as when the upper end of the conveyer frame 28 is shifted vertically, through operation of the handwheel 32.

A pair of scoops or plows 50 are supported at the lower end of the conveyor frame 28, by means of pivot members 51 that are rigidly secured to the plows and are rotatably mounted in the conveyor frame. Each of the plows 50 has a substantially flat portion A and a dished portion B. The portions A and B together have a form similar to the mold board of a land plow, so that material which accumulates upon the flat surface A will be guided toward the longitudinal center line of the conveyer, by the dished portions B. The forward edges of the portions A are toothed, so as to more effectively loosen material when the plows are oscillated in the manner hereinafter described, while the dished portions are surmounted by vertically-extending portions C for confining and guiding the flow of material.

The shaft 40$^a$ is provided with an eccentric 53 that has driving connection with an eccentric rod 54. The forward end of the rod 54 has pivotal connection with a universal joint member 55 that is in turn pivotally connected to a shaft-like extension 56 of a crank disc 57. The crank disc 57 is pivotally mounted in the framework 28, and at opposite edges has pivotal connection with links 59. The outer ends of the links 59 are connected to the rear ends of the lever arms 60 whose forward ends are rigidly connected to the plows 50. It will be seen that the oscillatory movements of the disc 57 will be transmitted to the levers 60 and the plows 50 thereby oscillated about their pivots.

The method of operation may be stated as follows:—

Upon energization of the motor 20 with the various clutches in operative position, the tractor will be advanced toward a body of material which is to be removed. The rear end of the conveyer frame 29 is at such elevation that the forward portion of the plows 50 will have the desired inclination with respect to the pile of material (not shown). Simultaneously with the advancing movement of the tractor, the plows 50 will be oscillated about their axes 51, through reciprocation of the eccentric rod 54 that is operated as above indicated. As the material is loosened and gathered upon the plows 50, it is guided toward the mid portion of the conveyer and caught by the scrapers or buckets 62 of the conveyer chains 63 and carried upwardly on the apron 62$^a$. At the upper end of the conveyer, the material may discharge directly into a truck body or into a distributor conveyer 64 which has its receiving end pivotally mounted upon the framework 3, so that the material may be discharged from the outer end (not shown) of the conveyer 64 to a plurality of points.

It will be seen that the tractor can be turned to move the forward or lower end of the conveyer 29 through an arc, by selective manipulation of the clutches 13 and 16 in a manner common in the tractor art, to thus move the plows 50 across the face of a pile of material. Thus the plows can be advanced into the body of material and simultaneously oscillated through the toggle connections 59 and 60, or may be oscillated independently of the movement of the tractor.

Where I herein refer to the members 50 as plows or scrapers, it will be understood that they may be of various other forms, such as scraper members which may be oscillated to not only loosen the material but to draw it toward the center line of the conveyer. It will be seen that the vertically-extending portions B and C of the scoops will exercise this drawing or scraping effect independently of the flattened portions A of the scoops.

Some of the many uses to which my invention may be put are in connection with removal of coal, cinders or the like, from storage piles, road-grading, etc. In such cases, the tractor and the plows will be advanced and the distributor conveyer 64 drawn along, with its discharge end extending transversely to the path of movement of the tractor, so as to discharge into vehicles that may be moved in the same direction as the tractor, thus avoiding backing or turning of the vehicles in order to place them in load-receiving position.

I claim as my invention:

1. Material handling apparatus comprising a conveyer, a scoop mounted at one end of the conveyer and having a vertically-projecting portion extending obliquely rearward to direct material deposited thereon to the conveyer, means for advancing the scoop against a body of material, and means for oscillating said scoop to loosen the material to be handled.

2. Material handling apparatus comprising a conveyer, a scoop mounted at one end of the conveyer and formed to direct material deposited thereon to the conveyer, when the scoop is advanced against a body of the material, and means for simultaneously oscillating said scoop in a horizontally-extended plane and advancing the same into a mass of material which is to be moved.

3. Material handling apparatus comprising a scoop of plow-like form and having an upwardly disposed material-receiving surface, and means for oscillating said scoop about a rearwardly-located vertically-extending axis and for advancing the same against a body of the material to shift the material rearwardly and transversely.

4. Material handling apparatus comprising a scoop of plow-like form and having an upwardly disposed material-receiving surface and having projections at its forward edge for breaking up friable material, and means for oscillating and advancing said scoop to shift the material so loosened in a direction rearwardly and transversely of the line of advancing movement.

5. Material handling apparatus comprising a conveyer, a scoop adjacent the conveyer, and means for oscillating the scoop, the scoop presenting a relatively wide digging edge and having it face turned upwardly to guide material across an upper surface of the scoop towards the conveyer when the scoop is advanced against a body of the material.

6. Material handling apparatus comprising a conveyer, means for advancing the conveyer toward a body of material, a scoop adjacent the conveyer, and means for oscillating the scoop, the scoop presenting a relatively wide toothed digging edge and having its face turned upwardly to guide material across an upper surface of the scoop toward the conveyer.

7. Material handling apparatus comprising a conveyer, a scoop adjacent the conveyer, the scoop being pivotally mounted on a vertically-extending axis, the scoop presenting a relatively wide digging edge and having its face turned upwardly to guide material across an upper surface of the scoop towards the conveyer, and means for oscillating the scoop.

8. Material handling apparatus comprising a conveyer, a pair of scoops whose combined width is at least as great as the width of the conveyer, each scoop having its face presented towards the conveyer and so shaped as to guide material across an upper surface of the scoop towards the conveyer, and means for substantially simultaneously moving the scoops toward or away from one another and against a body of the material.

9. Material handling apparatus comprising a movable carriage having a conveyer mounted thereon, and oscillating scoop means adapted to feed material to the conveyer, the scoop means presenting a digging edge at least as wide as the movable carriage and having an upwardly turned face so shaped as to guide material on top of the scoop means towards the conveyer when the carriage is advanced toward a body of the material.

10. Material handling apparatus comprising a movable carriage, a conveyer mounted thereon, a pair of opposed scoops adjacent the conveyer, the scoops having digging edges whose combined width is at least as great as the width of the carriage, and means for oscillating the scoops and advancing them, the scoops having upwardly turned faces so formed as to guide material thereon towards the conveyer.

11. The method of handling material which comprises forcing a scoop having an upwardly disposed material-receiving surface against a pile of the material in a horizontal plane, and simultaneously oscillating the forward edge of said scoop in a direction transverse to the line of advance, to effect loosening of the material and rearward movement thereof relative to the scoop.

In testimony whereof I the said HENRY B. WALKER have hereunto set my hand.

HENRY. B. WALKER.